United States Patent
Kim et al.

(10) Patent No.: US 12,024,239 B2
(45) Date of Patent: Jul. 2, 2024

(54) STEERING ASSIST DEVICE AND METHOD, AND STEERING SYSTEM

(71) Applicant: HL MANDO CORPORATION, Gyeonggi-do (KR)

(72) Inventors: Dae Sung Kim, Gyeonggi-do (KR); Sung Hoon Lee, Gyeonggi-do (KR); Seong Gwon Jeong, Gyeonggi-do (KR); Jung Ae Lee, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 195 days.

(21) Appl. No.: 17/795,534

(22) PCT Filed: Feb. 4, 2021

(86) PCT No.: PCT/KR2021/001498
§ 371 (c)(1),
(2) Date: Jul. 27, 2022

(87) PCT Pub. No.: WO2021/162344
PCT Pub. Date: Aug. 19, 2021

(65) Prior Publication Data
US 2023/0057078 A1    Feb. 23, 2023

(30) Foreign Application Priority Data

Feb. 11, 2020    (KR) .................. 10-2020-0016334

(51) Int. Cl.
*B62D 5/00*    (2006.01)
*B62D 5/04*    (2006.01)
(Continued)

(52) U.S. Cl.
CPC ............. *B62D 5/003* (2013.01); *B62D 5/046* (2013.01); *B62D 5/0481* (2013.01);
(Continued)

(58) Field of Classification Search
None
See application file for complete search history.

(56) References Cited

U.S. PATENT DOCUMENTS 7,931,112 B2 *    4/2011    Gehlhoff .................. B62D 5/30
                                                    180/417
8,272,471 B2 *    9/2012    Gehlhoff ............... B62D 5/097
                                                    180/417
(Continued)

FOREIGN PATENT DOCUMENTS

CN        101580079 A   * 11/2009   ............... B62D 1/22
CN        101746411 B   *  3/2013   ............. B62D 5/001
(Continued)

OTHER PUBLICATIONS

International Search Report for PCT/KR2021/001498 mailed on May 12, 2021 and its English Machine Translation by Google Translate (now published as WO 2021/162344).
(Continued)

*Primary Examiner* — Kevin R Steckbauer
(74) *Attorney, Agent, or Firm* — Womble Bond Dickinson (US) LLP

(57) ABSTRACT

The present embodiments relate to a steering assist device and method, and a steering system. The steering assist device comprises: first and second input-side steering control modules for controlling an input-side steering motor so that an input-side instrument connected to a steering wheel is assisted; and first and second output-side steering control modules for controlling an output-side steering motor so that an output-side instrument mechanically separated from the input-side instrument and connected to a wheel is assisted, wherein the first and second input-side steering control modules and the first and second output-side steering control modules arbitrate a role assignment and can control a corresponding steering motor from among the input-side
(Continued)

steering motor and the output-side steering motor according to the role assignment arbitration result.

15 Claims, 13 Drawing Sheets

(51) Int. Cl.
  *B62D 5/22* (2006.01)
  *B62D 5/30* (2006.01)
  *B62D 15/02* (2006.01)
  *H04L 12/40* (2006.01)
  *B62D 5/32* (2006.01)
(52) U.S. Cl.
  CPC ............ *B62D 5/0484* (2013.01); *B62D 5/22* (2013.01); *B62D 5/30* (2013.01); *B62D 15/025* (2013.01); *H04L 12/40013* (2013.01); *H04L 12/40084* (2013.01); *B62D 5/04* (2013.01); *B62D 5/32* (2013.01)

(56) References Cited

U.S. PATENT DOCUMENTS

| | | | | |
|---|---|---|---|---|
| 10,093,348 | B2 * | 10/2018 | Hales | H02P 5/74 |
| 10,442,459 | B2 * | 10/2019 | Siskoy | B62D 5/006 |
| 10,919,566 | B2 * | 2/2021 | Choi | B62D 5/0403 |
| 11,220,288 | B2 * | 1/2022 | Sachs | G07C 5/085 |
| 2009/0272598 | A1 * | 11/2009 | Gehlhoff | B62D 1/286 |
| | | | | 180/442 |
| 2011/0197983 | A1 * | 8/2011 | Gehlhoff | B62D 5/097 |
| | | | | 137/596 |
| 2015/0244302 | A1 | 8/2015 | Kumagai | |
| 2017/0361869 | A1 * | 12/2017 | Hales | H02P 6/04 |
| 2018/0111643 | A1 * | 4/2018 | Kim | B62D 5/04 |
| 2018/0257703 | A1 * | 9/2018 | Dreyer | B62D 5/0457 |
| 2019/0009813 | A1 * | 1/2019 | Siskoy | B62D 5/0484 |
| 2019/0382045 | A1 * | 12/2019 | Sachs | G07C 5/085 |
| 2020/0010094 | A1 * | 1/2020 | Nakada | B60W 50/023 |
| 2021/0276613 | A1 * | 9/2021 | Beres | B62D 5/0493 |
| 2022/0001916 | A1 * | 1/2022 | Kimura | B62D 5/0481 |
| 2022/0250675 | A1 * | 8/2022 | Jeong | H04L 12/40189 |
| 2023/0057078 | A1 * | 2/2023 | Kim | B62D 5/003 |
| 2023/0159095 | A1 * | 5/2023 | Kim | B62D 5/001 |
| | | | | 701/41 |
| 2023/0192186 | A1 * | 6/2023 | Kakas | B62D 6/008 |
| | | | | 701/41 |

FOREIGN PATENT DOCUMENTS

| | | | | |
|---|---|---|---|---|
| CN | 104718123 | A * | 6/2015 | ............. B62D 5/003 |
| CN | 107521553 | A * | 12/2017 | ........... B62D 5/0463 |
| CN | 107521553 | B * | 11/2019 | ........... B62D 5/0463 |
| CN | 112238894 | A * | 1/2021 | ........... B62D 5/0463 |
| CN | 109204442 | B * | 4/2021 | ......... B60R 16/0238 |
| CN | 112238894 | B * | 12/2021 | ........... B62D 5/0463 |
| CN | 114026010 | A * | 2/2022 | ............ B60W 10/20 |
| CN | 115103793 | A * | 9/2022 | ........... B62D 15/025 |
| CN | 110857117 | B * | 8/2023 | ............. B60R 16/03 |
| CN | 116587882 | A * | 8/2023 | |
| CN | 117261999 | A * | 12/2023 | ......... B60R 16/0231 |
| DE | 10333281 | A1 * | 2/2005 | ............. B62D 5/003 |
| DE | 10340369 | A1 * | 3/2005 | ............. B62D 5/003 |
| DE | 10340369 | B4 * | 1/2012 | ............. B62D 5/003 |
| DE | 102017113118 | A1 * | 12/2017 | ........... B62D 5/0463 |
| DE | 102018116367 | A1 * | 1/2019 | ......... B60R 16/0238 |
| DE | 102018209833 | B4 * | 3/2022 | ......... B60R 16/0232 |
| DE | 102021205826 | A1 * | 12/2022 | ........... G06F 11/1679 |
| DE | 112021000985 | T5 * | 12/2022 | ........... B62D 15/025 |
| EP | 2113445 | A1 * | 11/2009 | ............... B62D 1/22 |
| EP | 2113445 | B1 * | 12/2013 | ............... B62D 1/22 |
| EP | 3792148 | A1 * | 3/2021 | |
| EP | 4102743 | A2 * | 12/2022 | .......... G06F 11/1679 |
| JP | 2004010024 | A * | 1/2004 | ............. B62D 5/003 |
| JP | 2004182039 | A * | 7/2004 | ............. B62D 5/003 |
| JP | 3839358 | B2 * | 11/2006 | ............. B62D 5/003 |
| JP | 3847702 | B2 * | 11/2006 | ............. B62D 5/003 |
| JP | 4178217 | B2 * | 11/2008 | ............. B62D 5/001 |
| JP | 2014040160 | A * | 3/2014 | |
| JP | 5827191 | B2 * | 12/2015 | |
| JP | 2020075559 | A * | 5/2020 | ............. B62D 5/003 |
| JP | 7061055 | B2 * | 4/2022 | ............. B62D 5/003 |
| KR | 10-2014-0133161 | | 11/2014 | |
| KR | 10-2019-0131684 | | 11/2019 | |
| KR | 2167906 | B1 * | 10/2020 | ............ B60W 10/20 |
| RU | 2630569 | C2 * | 9/2017 | ............. B62D 5/003 |
| RU | 2632543 | C2 * | 10/2017 | ............ B60W 10/02 |
| RU | 2633023 | C2 * | 10/2017 | ............ B60W 10/02 |
| WO | WO-9717247 | A1 * | 5/1997 | ............... B62D 5/06 |
| WO | WO-0172571 | A2 * | 10/2001 | ............. B62D 5/003 |
| WO | WO-2005012063 | A1 * | 2/2005 | ............. B62D 5/003 |
| WO | WO-2020095752 | A1 * | 5/2020 | ............. B62D 5/003 |
| WO | 2020/256338 | | 12/2020 | |
| WO | WO-2020256338 | A1 * | 12/2020 | ............ B60W 10/20 |
| WO | WO-2021162344 | A1 * | 8/2021 | ........... B62D 15/025 |

OTHER PUBLICATIONS

Written Opinion of the International Searching Authority for PCT/KR2021/001498 mailed on May 12, 2021 and its English Machine Translation by Google Translate (now published as WO 2021/162344).

* cited by examiner

STEERING ASSIST DEVICE AND METHOD, AND STEERING SYSTEM

TECHNICAL FIELD

Embodiments of the disclosure relate to a steering assist device and method, and a steering system.

BACKGROUND ART

In general, steering system refers to a system in which the driver of a vehicle may change the steering angle of the wheels of a vehicle based on the steering force (or rotational force) applied to the steering wheel. Electromotive power steering systems, e.g., electric power steer (EPS), have been recently applied to vehicles to ensure stable steering by reducing the steering force of the steering wheel.

There is an increasing requirement for reliability and redundancy functionality in recent vehicle steering systems.

DETAILED DESCRIPTION OF THE INVENTION

Technical Problem

The present embodiments may provide a steering assist device capable of optimizing redundant usage and increasing the availability of the system.

Further, the present embodiments may provide a steering assist method capable of optimizing redundant usage and increasing the availability of the system.

Further, the present embodiments may provide a steering system capable of optimizing redundant usage and increasing the availability of the system.

Technical Solution

In an aspect, the present embodiments may provide a steering assist device comprising first and second input-side steering control modules controlling an input-side steering motor to allow an input-side mechanism connected with a steering wheel to be assisted and first and second output-side steering control modules controlling an output-side steering motor to allow an output-side mechanism mechanically separated from the input-side mechanism and connected with a wheel to be assisted, wherein the first and second input-side steering control modules and the first and second output-side steering control modules arbitrate role assignment and control a corresponding steering motor of the input-side steering motor and the output-side steering motor according to a result of arbitrating the role assignment.

In another aspect, the present embodiments may provide a steering assist method for assisting an input-side mechanism connected with a steering wheel and an output-side mechanism connected with a wheel, through first and second input-side steering control modules controlling an input-side steering motor connected with the input-side mechanism and first and second output-side steering control modules controlling an output-side steering motor connected with the output-side mechanism, comprising arbitrating role assignment through the first and second input-side steering control modules and the first and second output-side steering control modules and controlling a corresponding steering motor of the input-side steering motor and the output-side steering motor according to a result of role assignment arbitration through the first and second input-side steering control modules and the first and second output-side steering control modules.

In another aspect, the present embodiments may provide a steering system comprising a steering device including an input-side mechanism connected with a steering wheel and an output-side mechanism mechanically separated from the input-side mechanism and connected with a wheel and a steering assist device including first and second input-side steering control modules controlling an input-side steering motor to allow the input-side mechanism to be assisted; and first and second output-side steering control modules controlling an output-side steering motor to allow the output-side mechanism to be assisted, wherein the first and second input-side steering control modules and the first and second output-side steering control modules arbitrate role assignment and control a corresponding steering motor of the input-side steering motor and the output-side steering motor according to a result of arbitrating the role assignment.

Advantageous Effects

According to the present embodiments, there may be provided a steering assist device capable of optimizing redundant usage and increasing the availability of the system.

According to the present embodiments, there may be provided a steering assist method capable of optimizing redundant usage and increasing the availability of the system.

According to the present embodiments, there may be provided a steering system capable of optimizing redundant usage and increasing the availability of the system.

MODE FOR CARRYING OUT THE INVENTION

Figure 1:
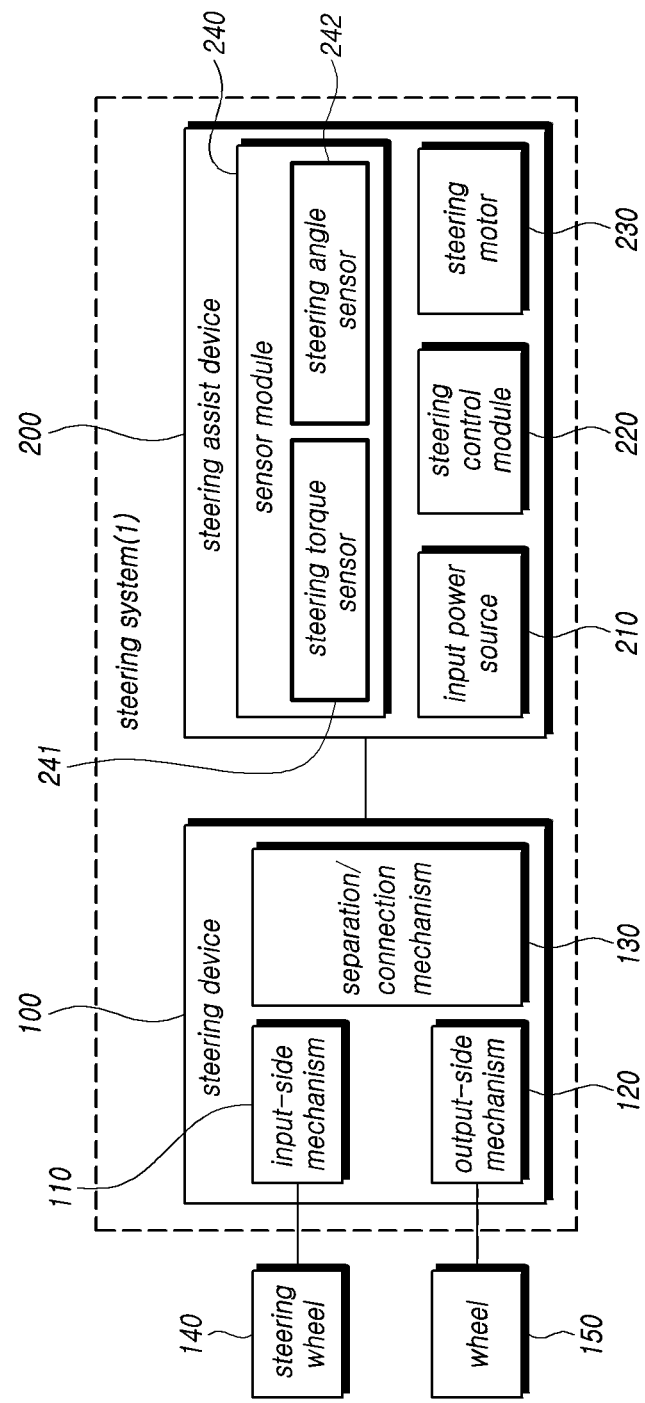
FIG. 1 is a block diagram illustrating an overall configuration of a steering system according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A steering assist device and method and steering system according to the present embodiments is described below with reference to the accompanying drawings.

FIG. 1 is a block diagram illustrating an overall configuration of a steering system according to the present embodiments.

Referring to FIG. 1, according to the present embodiments, a steering system 1 may include at least one of a steering device 100 or a steering assist device 200.

The steering device 100 may change the steering angle of a wheel 150 based on a steering force (or rotational force) applied to the steering wheel 140. The steering device 100 may include at least one of an input-side mechanism 110, an output-side mechanism 120, or a separation/connection mechanism 130. The input-side device 110, the output-side device 120, and the separation/connection device 130 may be connected by at least one of an electrical, magnetic, or mechanical connection.

The input-side mechanism 110 may be connected to the steering wheel 140. The input-side mechanism 110 may rotate in a rotational direction of the steering wheel 140 or in a direction opposite to the rotational direction of the steering wheel 140. The input-side mechanism 110 may include a steering shaft connected to the steering wheel 140 but, without limitations thereto, may include any mechanism (or device) that may rotate in the rotational direction of the steering wheel or in the direction opposite to the rotational direction of the steering wheel.

The output-side device 120 may be connected to the input-side device 110 by at least one of an electrical or mechanical connection. The output-side mechanism 120 may be connected to the wheel 150, changing the steering angle (or movement) of the wheel 150. The output-side mechanism 120 may include at least one of a pinion, a rack, a tie rod, or a knuckle arm but, without limitations thereto, may include any mechanism (or device) that may change the steering angle (or movement) of the wheel.

The separation/connection mechanism 130 may be connected to the input-side mechanism 110 and the output-side mechanism 120. The separation/connection mechanism 130 may mechanically and/or electrically connect or separate the input-side mechanism 110 and the output-side mechanism 120. The separation/connection mechanism 130 may include a clutch but, without limitations thereto, may include any mechanism (or device) that may mechanically and/or electrically connect and/or separate the input-side mechanism and the output-side mechanism.

Meanwhile, according to the present embodiments, the steering device 100 may include at least one of a steering device in which an input-side mechanism and an output-side mechanism are connected mechanically, a steering device (or steer by wire (SbW)) in which an input-side mechanism and an output-side mechanism are connected electrically, or a steering device (or an SbW including a clutch) in which an input-side mechanism and an output-side mechanism are connected with a separation/connection mechanism.

Meanwhile, the steering wheel 140 and the wheel 150 are illustrated as not being included in the steering device 100 but, without limitations thereto, may be included in the steering device 100.

The steering assist device 200 may be connected with the steering device 100. The steering assist device 200 may provide an assist steering force to the steering device 100.

According to an embodiment, the steering assist device 200 may include at least one of an input power source 210, a steering control module 220, a steering motor 230, or a sensor module 240. The input power source 210, the steering control module 220, the steering motor 230, and the sensor module 240 may be connected by at least one of an electrical, magnetic, or mechanical connection.

The input power source 210 may include at least one of a direct current (DC) power source or an alternating current (AC) power source. In particular, the DC power source may include a battery but, without limitations thereto, may include any power source may provide DC power.

The steering control module 220 may be connected to the input power source 210. The steering control module 220 may receive electric energy from the input power source 210, filter noise in the electric energy, generate an assist steering force by converting the filtered electric energy based on the steering motor control signal, and control the steering motor 230 based on the assist steering force.

The sensor module 240 may include at least one sensor.

Here, the sensor may include at least one of a steering torque sensor 241 and a steering angle sensor 242 but, without limitations thereto, may include any sensor capable of measuring the state of the vehicle and the steering state of the vehicle.

The steering torque sensor 241 may measure the steering torque of the steering wheel and provide the torque information about the steering wheel to the steering control module 220. Further, the steering angle sensor 242 may measure the steering angle of the steering wheel and provide steering angle information about the steering wheel to the steering control module 220.

The steering control module 220 may generate a steering motor control signal based on at least one piece of information among the steering torque information and steering angle information, generate an assist steering force by converting the filtered electric energy according to the steering motor control signal, and control the steering motor 230 based on the assist steering force.

The steering motor 230 may be connected with the steering control module 220. The steering motor 230 may operate based on the assist steering force provided from the steering control module 220, assisting the steering device 100 in steering.

The steering motor 230 may include at least one of a single winding-type steering motor or a dual winding-type steering motor but, without limitations thereto, may include any motor that may assist the steering device in steering.

The steering motor 230 may include at least one of a three-phase type motor, or a five-phase type motor but, without limitations thereto, may include any motor that may assist the steering device in steering.

Meanwhile, there may be provided a plurality of steering control modules 220. The plurality of steering control modules may include at least one input-side steering control module and at least one output-side steering control module. There may be provided a plurality of steering motors 230. The plurality of steering motors may include at least one input-side steering motor and at least one output-side steering motor.

For example, a steering system according to the present embodiments may comprise a steering device 100 including an input-side mechanism 110 connected with a steering wheel 140 and an output-side mechanism 120 connected with a wheel 150; and a steering assist device 200 including a plurality of input-side steering control modules controlling an input-side steering motor to allow the input-side mechanism 110 to be assisted; and a plurality of output-side steering control modules controlling an output-side steering motor to allow the output-side mechanism 120 to be assisted. The plurality of input-side steering control modules and the plurality of output-side steering control modules may arbitrate role assignment and control a corresponding steering motor of the input-side steering motor and the output-side steering motor according to a result of arbitrating the role assignment.

In particular, when the steering control module 220 includes the first and second input-side steering control modules and the first and second output-side steering control modules, and the steering motors 230 include the input-side steering motor and the output-side steering motor, the steering system 1 according to the present embodiments may comprise a steering device 100 including an input-side mechanism 110 connected with a steering wheel 140 and an output-side mechanism 120 connected with a wheel 140; and a steering assist device 200 including first and second input-side steering control modules controlling an input-side steering motor to allow the input-side mechanism 110 to be assisted; and first and second output-side steering control modules controlling an output-side steering motor to allow the output-side mechanism 120 to be assisted. The first and second input-side steering control modules and the first and second output-side steering control modules may arbitrate role assignment and control a corresponding steering motor of the input-side steering motor and the output-side steering motor according to a result of arbitrating the role assignment.

Here, the steering device 100 may include an input-side mechanism 110 connected with a steering wheel 140 and an output-side mechanism 120 mechanically separated from the input-side mechanism 110 and connected with a wheel 150.

In the following description, for simplicity of description, it is described that the steering device 100 is a steer by wire (SbW) steering device, and the steering control module 220 includes the first and second input-side steering control modules and the first and second output-side steering control modules. However, without limitations thereto, the following description may apply to any structure that may assist the steering device through a plurality of steering control modules.

Figure 2:
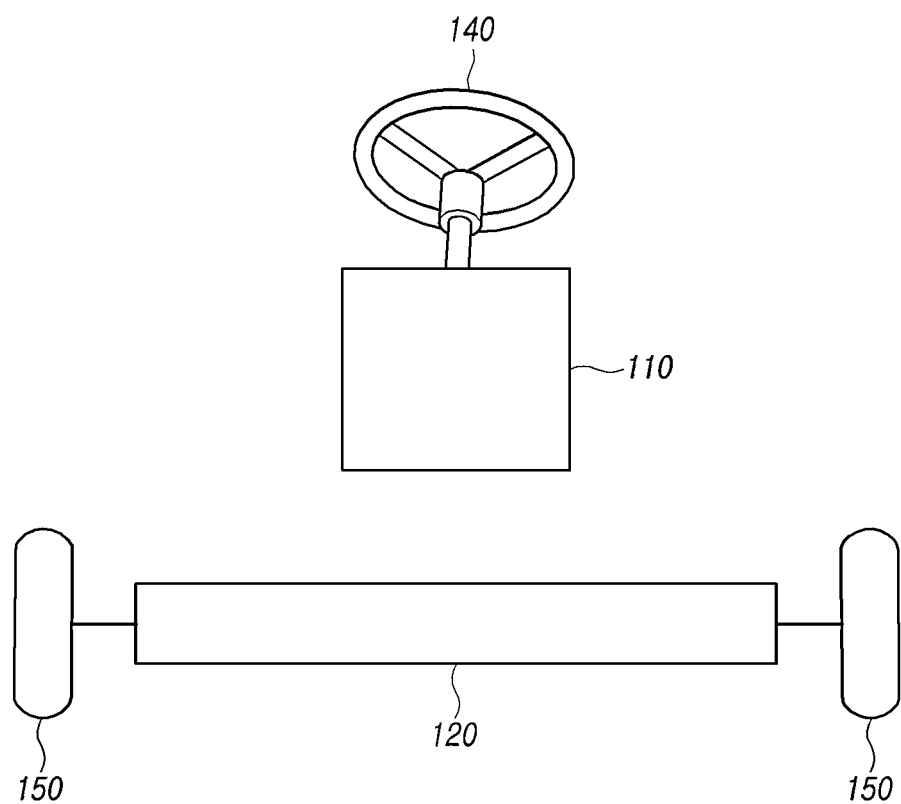
FIG. 2 is a view illustrating a steering device according to the present embodiments.

FIG. 2 is a view illustrating a steering device according to an embodiment.

Referring to FIG. 2, according to an embodiment, a steering device 100 may include an input-side mechanism 110 connected with a steering wheel 140 and an output-side mechanism 120 mechanically separated from the input-side mechanism 110 and connected with a wheel 150. In other words, according to an embodiment, the steering device 100 may be a steer by wire (SbW) steering device.

The input-side mechanism 110 may rotate in a rotational direction of the steering wheel 140 or in a direction opposite to the rotational direction of the steering wheel 140, and may include, e.g., a steering shaft connected with the steering wheel 140. The output-side mechanism 120, which is mechanically separated from the input-side mechanism 110 and is electronically connected therewith, may be connected with the wheel 150, changing the steering angle (or movement) of the wheel. The input-side mechanism 110 may include at least one of a pinion, a rack, a tie rod, or a knuckle arm.

Figure 3:
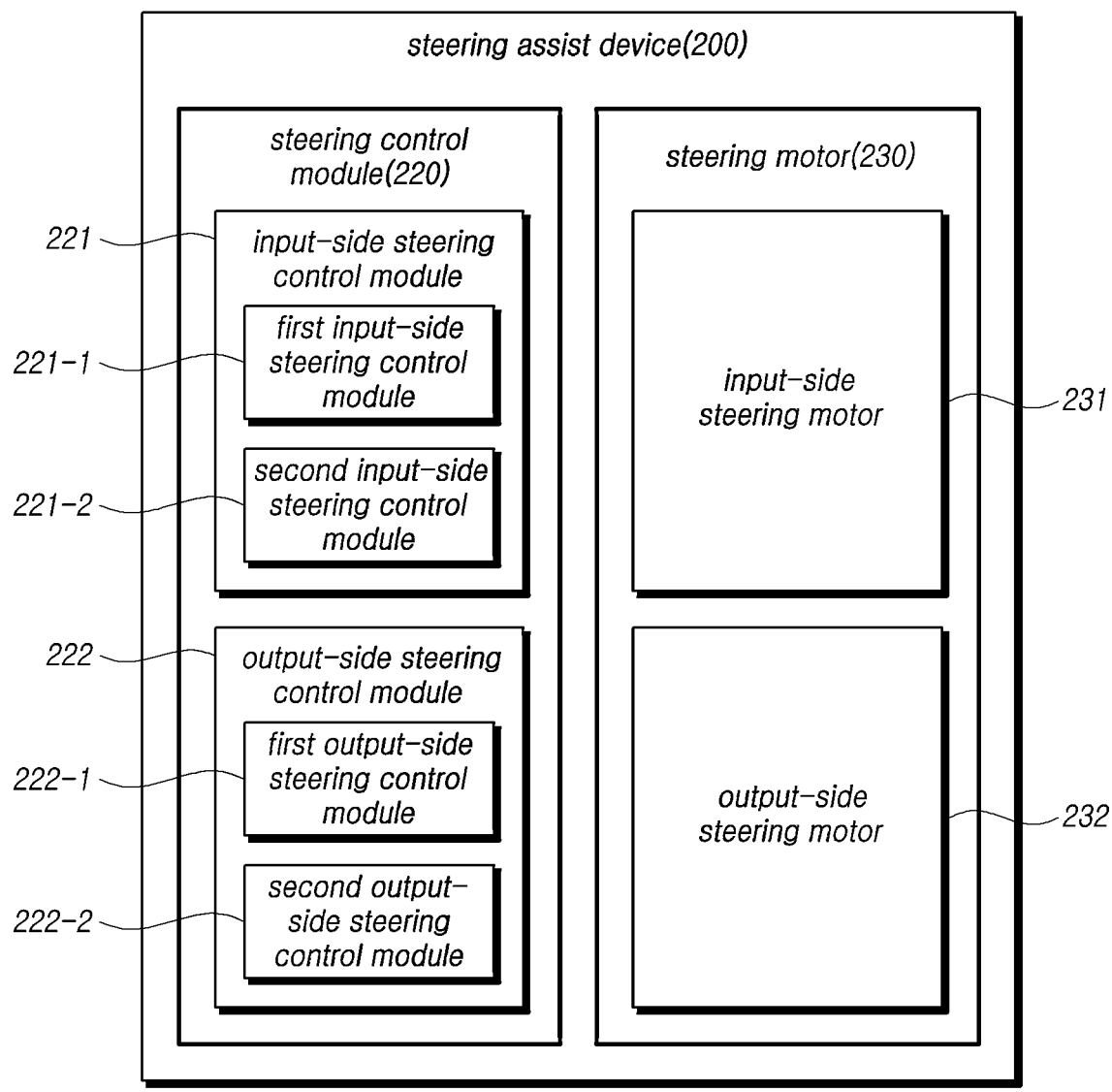
FIG. 3 is a view illustrating a steering assist device according to the present embodiments.

FIG. 3 is a view illustrating a steering assist device according to the present embodiments.

Referring to FIG. 3, the steering assist device 200 according to the present embodiments may include at least one of a steering control module 220 and a steering motor 230. The steering control module 220 may include at least one of an input-side steering control module 221 or an output-side steering control module 222. The input-side steering control module 221 may include at least one of a first input-side steering control module 221-1 and a second input-side steering control module 221-2. The output-side steering control module 222 may include at least one of a first output-side steering control module 222-1 and a second output-side steering control module 222-2. The steering motor 230 may include at least one of an input-side steering motor 231 and an output-side steering motor 232.

Meanwhile, the steering assist device 200 according to the present embodiments may include first and second input-side steering control modules 221-1 and 221-2 controlling the input-side steering motor 231 to allow the input-side mechanism connected with the steering wheel to be assisted; and first and second output-side steering control modules 222-1 and 222-2 controlling the output-side steering motor 232 to allow the output-side mechanism mechanically separated from the input-side mechanism and connected with a wheel to be assisted. The first and second input-side steering control modules 221-1 and 221-2 and the first and second output-side steering control modules 222-1 and 222-2 may arbitrate role assignment and control a corresponding steering motor of the input-side steering motor 231 and the output-side steering motor 232 according to a result of arbitrating the role assignment.

Here, the role assignment is to determine the role for the first and second input-side steering control modules 221-1 and 221-2 and the first and second output-side steering control modules 222-1 and 222-2 and may mean determining that one of the first and second input-side steering control modules 221-1 and 221-2 is an input-side primary steering control module and the other is an input-side redundant steering control module (or input-side sub steering control module) and that one of the first and second output-side steering control modules 222-1 and 222-2 is an output-side primary steering control module and the other is an output-side redundant steering control module (or an output-side sub steering control module).

Accordingly, the first and second input-side steering control modules 221-1 and 221-2 and the first and second output-side steering control modules 222-1 and 222-2 may arbitrate the role assignment upon initial operation of the steering assist device 200. For example, when the ignition IGN is in an off state, and the engine is in a stop state, the first and second input-side steering control modules 221-1 and 221-2 and the first and second output-side steering control modules 222-1 and 222-2 may be in the off state and later, when the ignition IGN switches to an on state, and the engine is in the stop state, the first and second input-side steering control modules 221-1 and 221-2 and the first and second output-side steering control modules 222-1 and 222-2 may test the initialization state and, at this time, arbitrate their respective role assignments.

Specifically, the first and second input-side steering control modules 221-1 and 221-2 may be connected with the input-side steering motor 231 to control the input-side steering motor 231. The input-side steering motor 231 may be connected with the input-side mechanism connected with the steering wheel to assist the input-side mechanism.

The first and second output-side steering control modules 222-1 and 222-2 may be connected with the output-side steering motor 232 to control the output-side steering motor 232. The output-side steering motor 232 may be connected with the output-side mechanism mechanically separated from the input-side mechanism and connected with the wheel to assist the output-side mechanism.

For example, the first and second input-side steering control modules 221-1 and 221-2 and the first and second output-side steering control modules 222-1 and 222-2 may arbitrate the role assignment. The first and second input-side steering control modules 221-1 and 221-2 may control the input-side steering motor 231 according to the result of input-side role assignment arbitration. The first and second output-side steering control modules 222-1 and 222-2 may control the output-side steering motor 232 according to the result of output-side role assignment arbitration.

In other words, the first and second input-side steering control modules 221-1 and 221-2 may arbitrate the input-side role assignment and, if succeeding in the input-side role assignment, control the input-side steering motor 231 according to the result of input-side role assignment arbitration but, if failing to arbitrate the input-side role assignment, control the input-side steering motor 231 according to the result of input-side role assignment arbitration through the first and second output-side steering control modules 222-1 and 222-2.

Here, if the first and second input-side steering control modules 221-1 and 221-2 fail to arbitrate the input-side role assignment, the first and second output-side steering control modules 222-1 and 222-2 may arbitrate input-side role assignment instead of the first and second input-side steering control modules 221-1 and 221-2 and provide the result of input-side role assignment arbitration to the first and second input-side steering control modules 221-1 and 221-2. The first and second input-side steering control modules 221-1 and 221-2 may control the input-side steering motor 231 according to the result of input-side role assignment arbitration received from the first and second output-side steering control modules 222-1 and 222-2.

Further, the first and second output-side steering control modules 222-1 and 222-2 may arbitrate the output-side role assignment and, if succeeding in the output-side role assignment, control the output-side steering motor 232 according to the result of output-side role assignment arbitration but, if failing to arbitrate the output-side role assignment, control the output-side steering motor 232 according to the result of output-side role assignment arbitration through the first and second input-side steering control modules 221-1 and 221-2.

Here, if the first and second output-side steering control modules 222-1 and 222-2 fail to arbitrate the output-side role assignment, the first and second input-side steering control modules 221-1 and 221-2 may arbitrate output-side role assignment instead of the first and second output-side steering control modules 222-1 and 222-2 and provide the result of output-side role assignment arbitration to the first and second output-side steering control modules 222-1 and 222-2. The first and second output-side steering control modules 222-1 and 222-2 may control the output-side steering motor 232 according to the result of output-side role assignment arbitration received from the first and second input-side steering control modules 221-1 and 221-2.

As described above, the steering assist device according to the present embodiments may arbitrate role assignment through the first and second input-side steering control modules and the first and second output-side steering control modules and control the input-side steering motor and the output-side steering motor based thereupon, thereby optimizing redundant usage and increasing the availability of the system.

Figure 4:
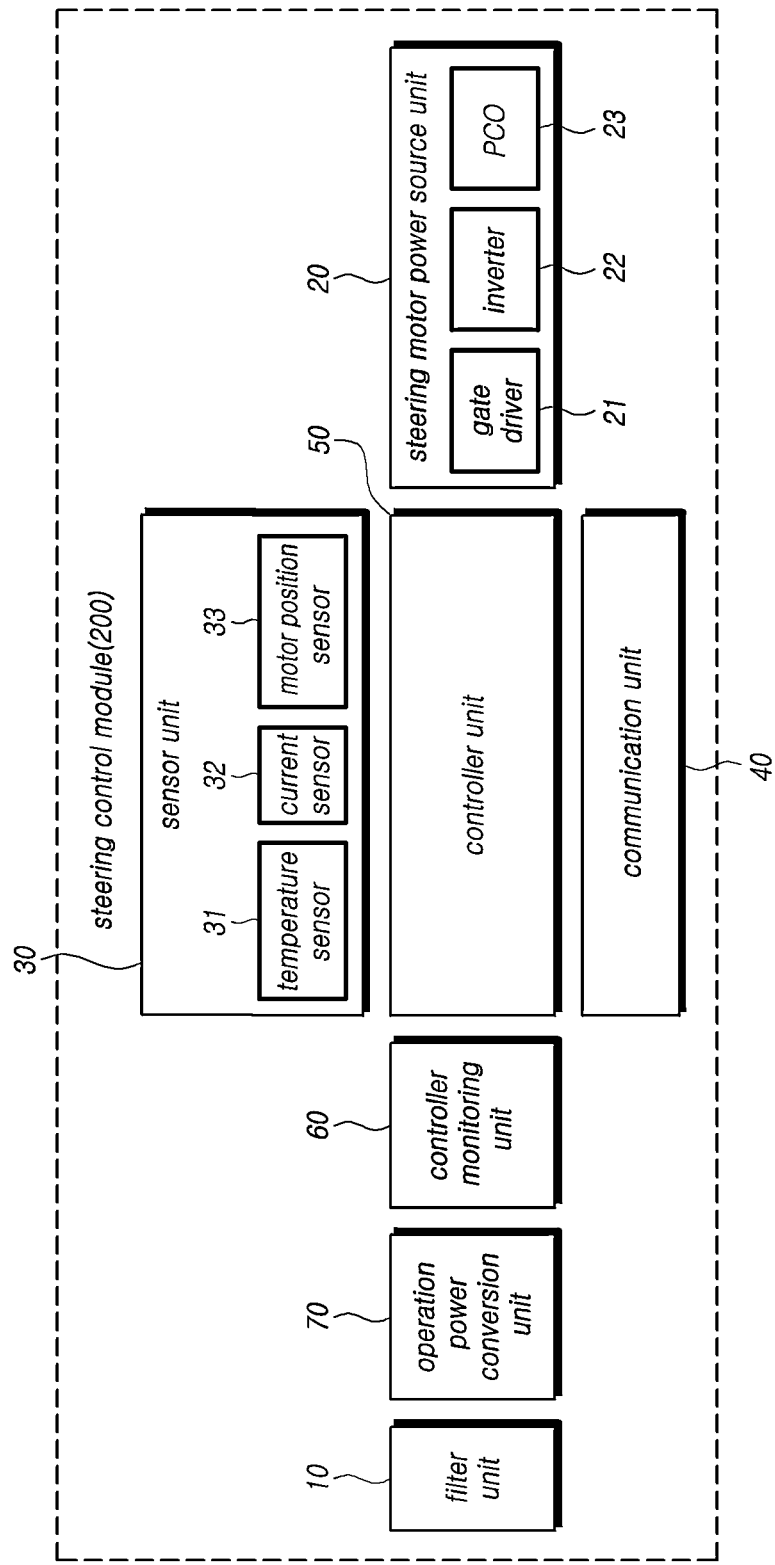
FIG. 4 is a block diagram illustrating a specific configuration of a steering control module according to the present embodiments.

FIG. 4 is a block diagram illustrating a specific configuration of a steering control module according to an embodiment.

Referring to FIG. 4, a steering control module 220 according to the present embodiments may include at least one of a filter unit 10, a steering motor power source unit 20, a sensor unit 30, a communication unit 40, a controller unit 50, a controller monitoring unit 60, and an operation power conversion unit 70. The filter unit 10, the steering motor power source unit 20, the sensor unit 30, the communication unit 40, the controller unit 50, the controller monitoring unit 60, and the operation power conversion unit 70 may be connected by at least one of an electrical, magnetic, or mechanical connection.

The components included in the steering control module 220 may be equally included in the first and second input-side steering control modules and the first and second output-side steering control modules.

The filter unit 10 may be connected to the input power source. The filter unit 10 may filter noise of electric energy provided from the input power source and provide the filtered electric energy to the steering motor power source unit 20 and the operation power conversion unit 70.

The steering motor power source unit 20 may be connected with the filter unit 10 and may receive filtered electric energy. The steering motor power source unit 20 may be connected with the controller unit 50 and may receive a steering motor control signal. The steering motor power source unit 20 may generate an assist steering force by converting the filtered electric energy based on the steering motor control signal, and control the steering motor based on the assist steering force.

The steering motor power source unit 20 may include a gate driver 21, an inverter 22, and a phase disconnector (PCO) 23.

The gate driver 21 may receive the steering motor control signal from the controller unit 50, generate a gate signal based on the steering motor control signal, and provide the gate signal to the inverter 22. The inverter 22 may convert the filtered electric energy of the filter unit according to the gate signal, generating an assist steering force. The phase disconnector (e.g., a breaker or a disconnecting switch) 23 is positioned between the inverter 22 and the steering motor and may supply or cut off the assist steering force provided from the inverter 22 to the steering motor.

The sensor unit 30 may include at least one of a temperature sensor 31, a current sensor 32, or a motor position sensor 33 but, without limitations thereto, may include any sensor that may measure the state of the steering system (or the steering control module).

The temperature sensor 31 may measure the temperature of the steering control module 220 and provide the temperature information to the controller unit 50. Further, the current sensor 32 may measure the assist current (or assist steering force) provided from the steering motor power source unit 20 to the steering motor and provide the assist current information to the controller unit 350. The motor position sensor 33 may measure the position of the steering motor and provide the position information about the steering motor to the controller unit 50.

The communication unit 40 may include at least one of an internal communication unit or an external communication unit. When there are a plurality of steering control modules, the internal communication unit may be connected with other steering control modules to receive or provide information. The external communication unit may be connected with the vehicle to receive vehicle state information (e.g., vehicle speed information) from the vehicle or provide information related to the steering system to the vehicle.

The controller unit 50 may be connected with each component of the steering control module 220 to provide or receive information to control the operation for each component of the steering control module 220.

For example, the controller unit 50 may generate a steering motor control signal based on at least one of the torque information about the steering wheel, steering angle information about the steering wheel, temperature information, assist current information, position information about the steering motor, vehicle state information (e.g., vehicle speed information), state information about the input power source, short circuit (or overcurrent) state information, current sensing information about the filter unit, or state information about the steering motor, and provide the steering motor control signal to the gate driver, or may generate a separation/connection control signal (e.g., a clutch control signal) and provide the separation/connection control signal to the separation/connection mechanism.

The controller unit 50 may include a microcontroller but, without limitations thereto, may include any device (or computer) that may process (or execute or compute) programs.

The controller monitoring unit 60 may be connected with the controller unit 50. The controller monitoring unit 60 may monitor the operating state of the controller unit 50. For example, the controller unit 50 may provide a watchdog signal to the controller monitoring unit 60. The controller monitoring unit 60 may be cleared based on the watchdog signal received from the controller unit 50 or may generate a reset signal and provide the reset signal to the controller unit 50.

The controller monitoring unit 60 may include a watchdog but, without limitations thereto, may include any device capable of monitoring the controller unit. In particular, a watchdog may include a window watchdog having a deadline, that is, a start and an end.

The operation power conversion unit 70 may be connected with the filter unit 10. The operation power conversion unit 70 may generate an operating voltage for each component of the steering control module 220 by converting the filtered electric energy of the filter unit 10. The operation power conversion unit 70 may include at least one of a DC-DC converter or a regulator but, without limitations thereto, may include any device that may convert the output from the filter unit to thereby generate an operating voltage for each component of the steering control module.

The steering control module 220 may include an electronic control unit (ECU) but, without limitations thereto, may include any controller (or system) that may perform electronic control.

Meanwhile, the controller unit 50 included in each of the first and second input-side steering control modules and the first and second output-side steering control modules arbitrate role assignment and control a corresponding steering motor of the input-side steering motor and the output-side steering motor according to a result of arbitrating the role assignment.

Figure 5:
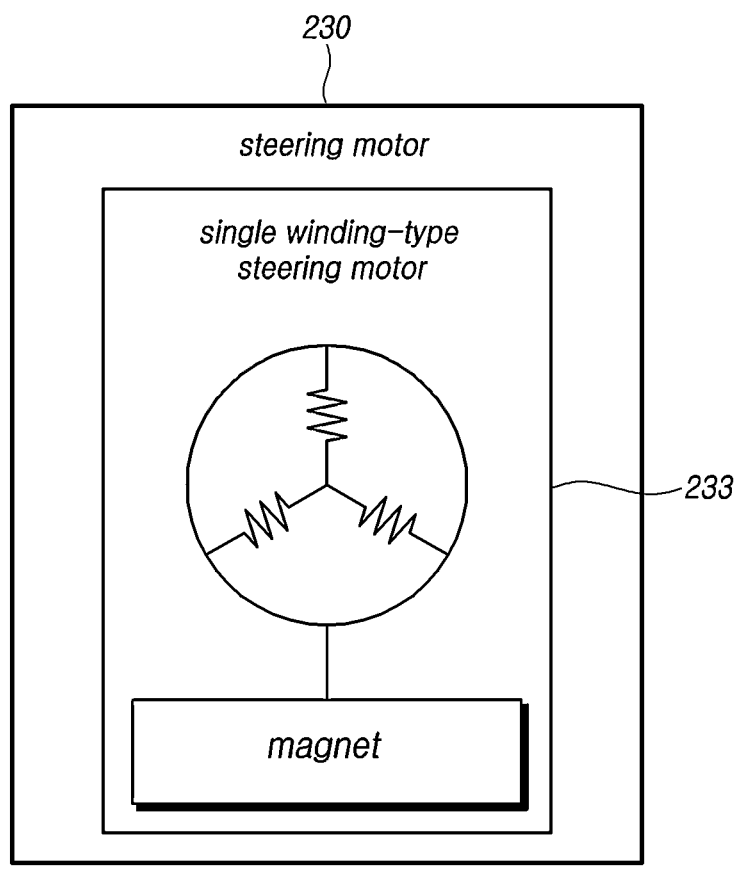
FIGS. 5 and 6 are views illustrating a steering motor according to the present embodiments.
Figure 6:
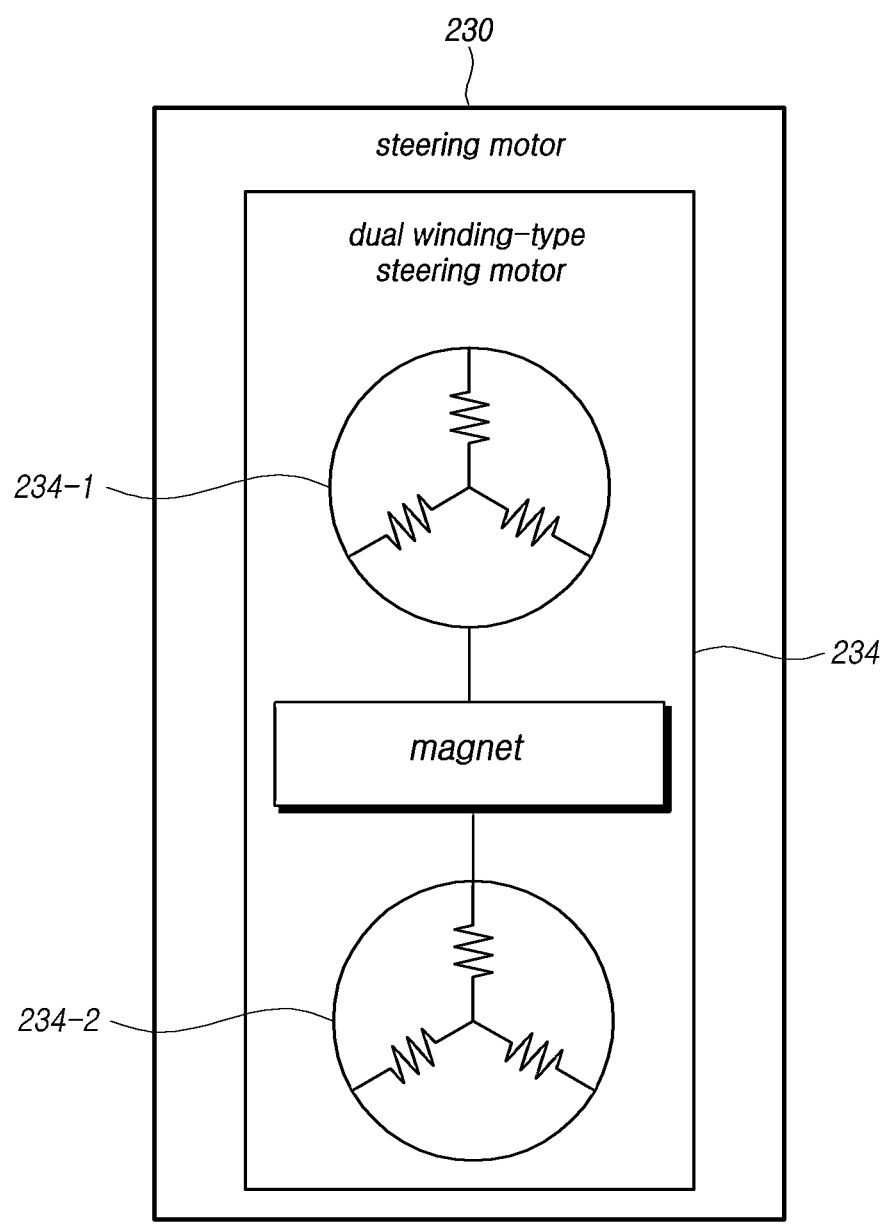

FIGS. 5 and 6 are views illustrating a steering motor according to the present embodiments.

Referring to FIG. 5, the steering motor 230 according to the present embodiments may include a single winding-type steering motor 233. In particular, the steering motor 230 may include a three-phase single winding-type motor but, without limitations thereto, may include any motor that may assist steering. Further, the magnet may include a circular magnet but, without limitations thereto, various changes may be made to the shape of the magnet. The magnetic flux of the magnet may be measured through a motor position sensor of the steering control module.

In particular, in the single winding-type steering motor, at least one phase (e.g., three-phase, five-phase, or six-phase) may be included in one winding. One winding may be connected to two steering control modules to control its operation.

Referring to FIG. 6, the steering motor 230 according to the present embodiments may include a dual winding-type steering motor 234. In particular, the steering motor 230 may include a three-phase dual winding-type steering motor but, without limitations thereto, may include any motor that may assist steering. Further, the magnet may include a circular magnet but, without limitations thereto, various changes may be made to the shape of the magnet. The magnetic flux of the magnet may be measured through a motor position sensor of the steering control module.

In particular, in the dual winding-type steering motor 234, at least one phase (e.g., three-phase, five-phase, or six-phase) may be included in each of two windings 234-1 and 234-2. A first winding 234-1 may be connected to one steering control module to control its operation. A second winding 234-2 may be connected to another steering control module to control its operation.

Meanwhile, the steering assist device according to the present embodiments may further include a steering motor 230. For example, the steering motor 230 according to the present embodiments may further include an input-side steering motor including a single winding-type input-side steering motor or a dual winding-type input-side steering motor; and an output-side steering motor including a single winding-type output-side steering motor or a dual winding-type output-side steering motor.

FIGS. 7 to 11 are views illustrating, in detail, a steering assist method according to the present embodiments.

In the following description, the first and second input-side steering control modules 221-1 and 221-2 and the first and second output-side steering control modules 222-1 and 222-2 are assumed to be ECUs.

Figure 7:
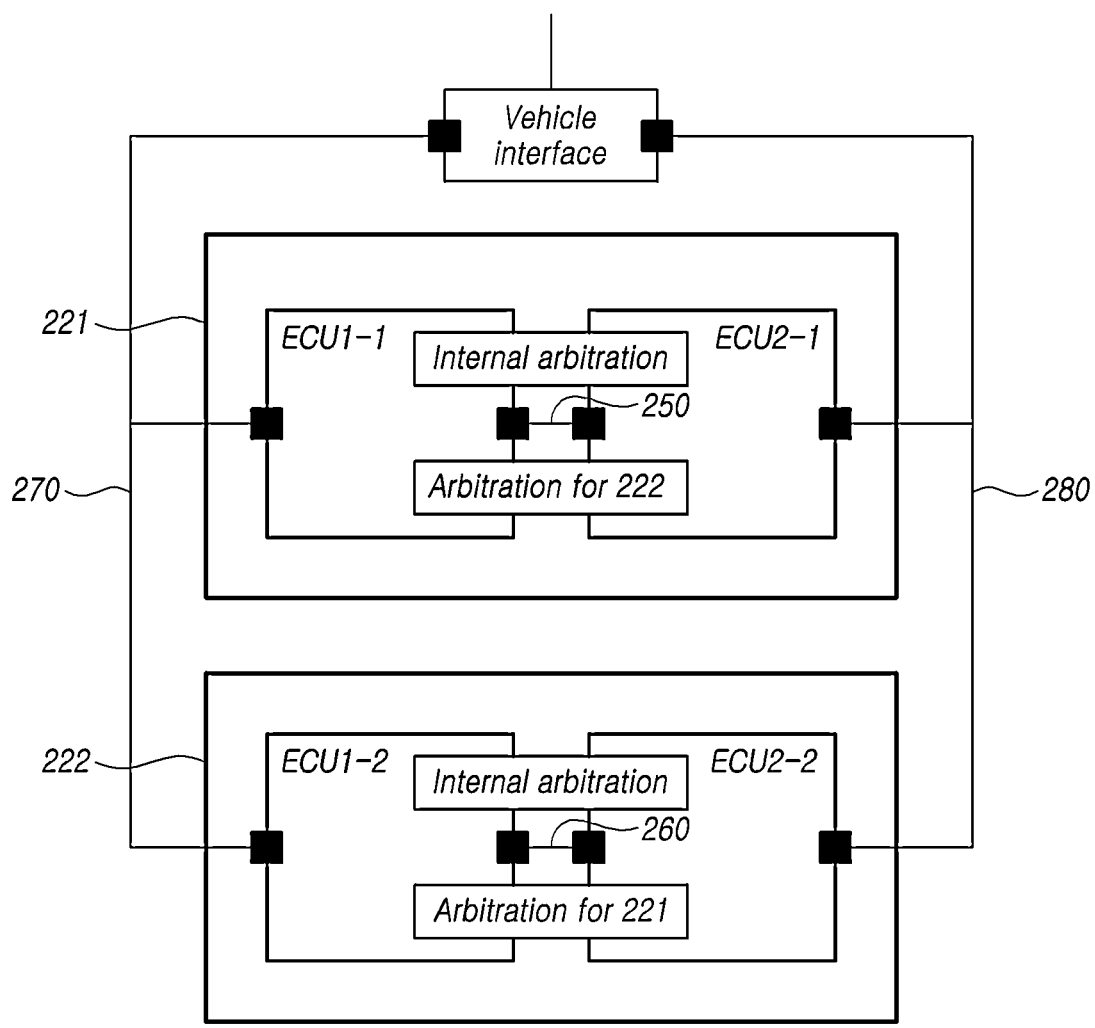
FIGS. 7 to 11 are views illustrating, in detail, a steering assist method according to the present embodiments.

Referring to FIG. 7, the steering assist device 200 according to the present embodiments may further include a first internal communication channel 250 connecting the first input-side steering control module ECU-1 and the second input-side steering control module ECU2-1; a second internal communication channel 260 connecting the first output-side steering control module ECU1-2 and the second output-side steering control module ECU2-2; a first external communication channel 270 connecting the first input-side steering control module ECU1-1 and the first output-side steering control module ECU1-2 and connected with the vehicle; and a second external communication channel 280 connecting the second input-side steering control module ECU2-1 and the second output-side steering control module ECU2-2 and connected with the vehicle.

A specific operation flow is described. The first and second input-side steering control modules ECU1-1 and ECU2-1 may monitor their mutual states through the first internal communication channel 250 to arbitrate the input-side role assignment and, upon succeeding in the input-side role assignment, control the input-side steering motor according to the result of input-side role assignment arbitration and, upon failing to arbitrate the input-side role assignment, control the input-side steering motor according to the result of input-side role assignment arbitration by the first and second output-side steering control modules ECU1-2 and ECU2-2, received through the first and second external communication channels 270 and 280.

For example, when the first internal communication channel 250 is in the normal state so that their mutual states are identified, and the identified mutual states are in the normal state, the first and second input-side steering control modules ECU1-1 and ECU2-1 may determine that one is an input-side primary steering control module, and the other is an input-side redundant steering control module and control the input-side steering motor and, when the first internal communication channel 250 is in the abnormal state so that their mutual states are not identified, but each state is in the normal state, determine that one is an input-side primary steering control module and the other is an input-side redundant steering control module according to the result of input-side role assignment arbitration by the first and second output-side steering control modules ECU1-2 and ECU2-2, received through the first and second external communication channels 270 and 280 and control the input-side steering motor.

Here, when the first internal communication channel 250 is in the abnormal state so that the mutual states of the first and second input-side steering control modules ECU1-1 and ECU2-1 are not identified, but each state is in the normal state, the first and second output-side steering control modules ECU1-2 and ECU2-2 may, instead of the first and second input-side steering control modules ECU1-1 and ECU2-1, arbitrate the input-side role assignment and provide the result of input-side role assignment arbitration to the first and second input-side steering control modules ECU1-1 and ECU2-1. The first and second input-side steering control modules ECU1-1 and ECU2-1 may determine that one is an input-side primary steering control module and the other is an input-side redundant steering control module according to the result of input-side role assignment arbitration received from the first and second output-side steering control modules ECU1-2 and ECU2-2 and control the input-side steering motor.

Further, the first and second output-side steering control modules ECU1-2 and ECU2-2 may monitor their mutual states through the first internal communication channel 260 to arbitrate the output-side role assignment and, upon succeeding in the output-side role assignment, control the output-side steering motor according to the result of output-side role assignment arbitration and, upon failing to arbitrate the output-side role assignment, control the output-side steering motor according to the result of output-side role assignment arbitration by the first and second input-side steering control modules ECU1-1 and ECU2-1, received through the first and second external communication channels 270 and 280.

For example, when the second internal communication channel 260 is in the normal state so that their mutual states are identified, and the identified mutual states are in the normal state, the first and second output-side steering control modules ECU1-2 and ECU2-2 may determine that one is an output-side primary steering control module, and the other is an output-side redundant steering control module and control the output-side steering motor and, when the second internal communication channel 260 is in the abnormal state so that their mutual states are not identified, but each state is in the normal state, determine that one is an output-side primary steering control module and the other is an output-side redundant steering control module according to the result of output-side role assignment arbitration by the first and second input-side steering control modules ECU1-1 and ECU2-1, received through the first and second external communication channels 270 and 280 and control the output-side steering motor.

Here, when the second internal communication channel 260 is in the abnormal state so that the mutual states of the first and second output-side steering control modules ECU1-2 and ECU2-2 are not identified, but each state is in the normal state, the first and second input-side steering control modules ECU1-1 and ECU2-1 may, instead of the first and second output-side steering control modules ECU1-2 and ECU2-2, arbitrate the output-side role assignment and provide the result of output-side role assignment arbitration to the first and second output-side steering control modules ECU1-2 and ECU2-2. The first and second output-side steering control modules ECU1-2 and ECU2-2 may determine that one is an output-side primary steering control module and the other is an output-side redundant steering control module according to the result of output-side role assignment arbitration received from the first and second input-side steering control modules ECU1-1 and ECU2-1 and control the output-side steering motor.

As described above, in the steering assist device according to the present embodiments, when the first input-side steering control module ECU1-1 of the first and second input-side steering control modules ECU1-1 and ECU2-1 is in a no wakeup state, and the second input-side steering control module ECU2-1 is in the normal state, an input-side role assignment arbitration error occurs in the input-side steering control modules and, at this time, the output-side steering control modules, instead of the input-side steering control modules, arbitrate input-side role assignment and, when the first output-side steering control module ECU1-2 of the first and second output-side steering control modules ECU1-2 and ECU2-2 is in the no wakeup state, and the second output-side steering control module ECU2-2 is in the normal state, an output-side role assignment arbitration error occurs in the output-side steering control modules and, at this time, the input-side steering control modules, instead of the output-side steering control modules, arbitrate output-side role assignment. Thus, it is possible to increase the availability of the steering system through the redundant usage optimization of the steering system (e.g., an SbW system) and maximize the limp home/aside function against to thereby enhance safety.

Figure 8:
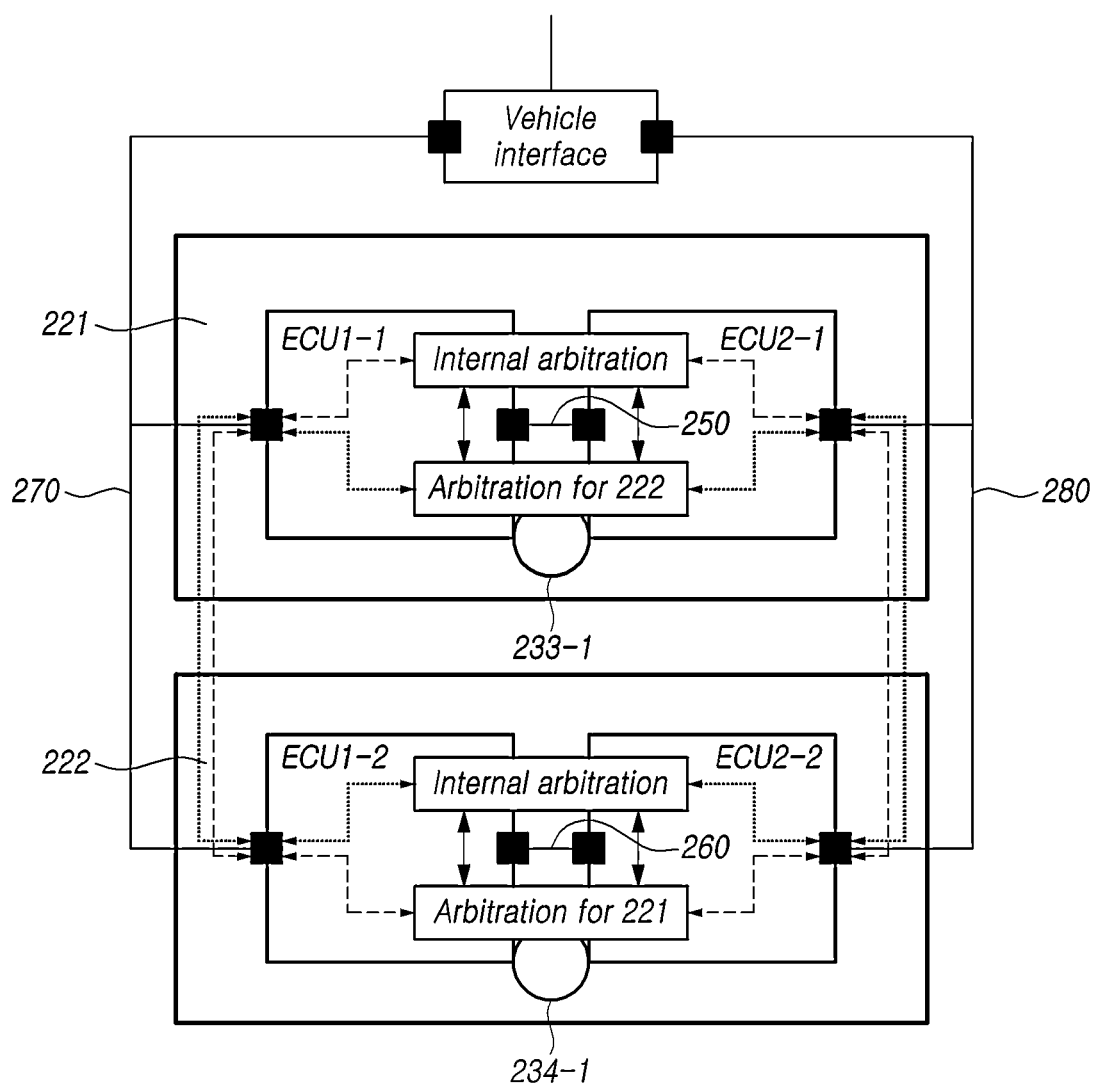

Referring to FIG. 8, in the steering assist device 220 according to the present embodiments, the input-side steering motor may include a single winding-type input-side steering motor 233-1, and the output-side steering motor may include a single winding-type output-side steering motor 243-1.

The first and second input-side steering control modules ECU1-1 and ECU2-1 may arbitrate input-side role assignment and determine that one is an input-side primary steering control module and the other is an input-side redundant steering control module according to the result of input-side role assignment arbitration. The input-side primary steering control module may control the single winding-type input-side steering motor 233-1 and, if the input-side primary steering control module switches to the abnormal state, the input-side redundant steering control module may control the single winding-type input-side steering motor 233-1 instead of the input-side primary steering control module.

The first and second output-side steering control modules ECU1-2 and ECU2-2 may arbitrate output-side role assignment and determine that one is an output-side primary steering control module and the other is an output-side redundant steering control module according to the result of output-side role assignment arbitration. The output-side primary steering control module may control the single winding-type output-side steering motor 234-1 and, if the output-side primary steering control module switches to the abnormal state, the output-side redundant steering control module may control the single winding-type output-side steering motor 234-1 instead of the output-side primary steering control module.

Figure 9:
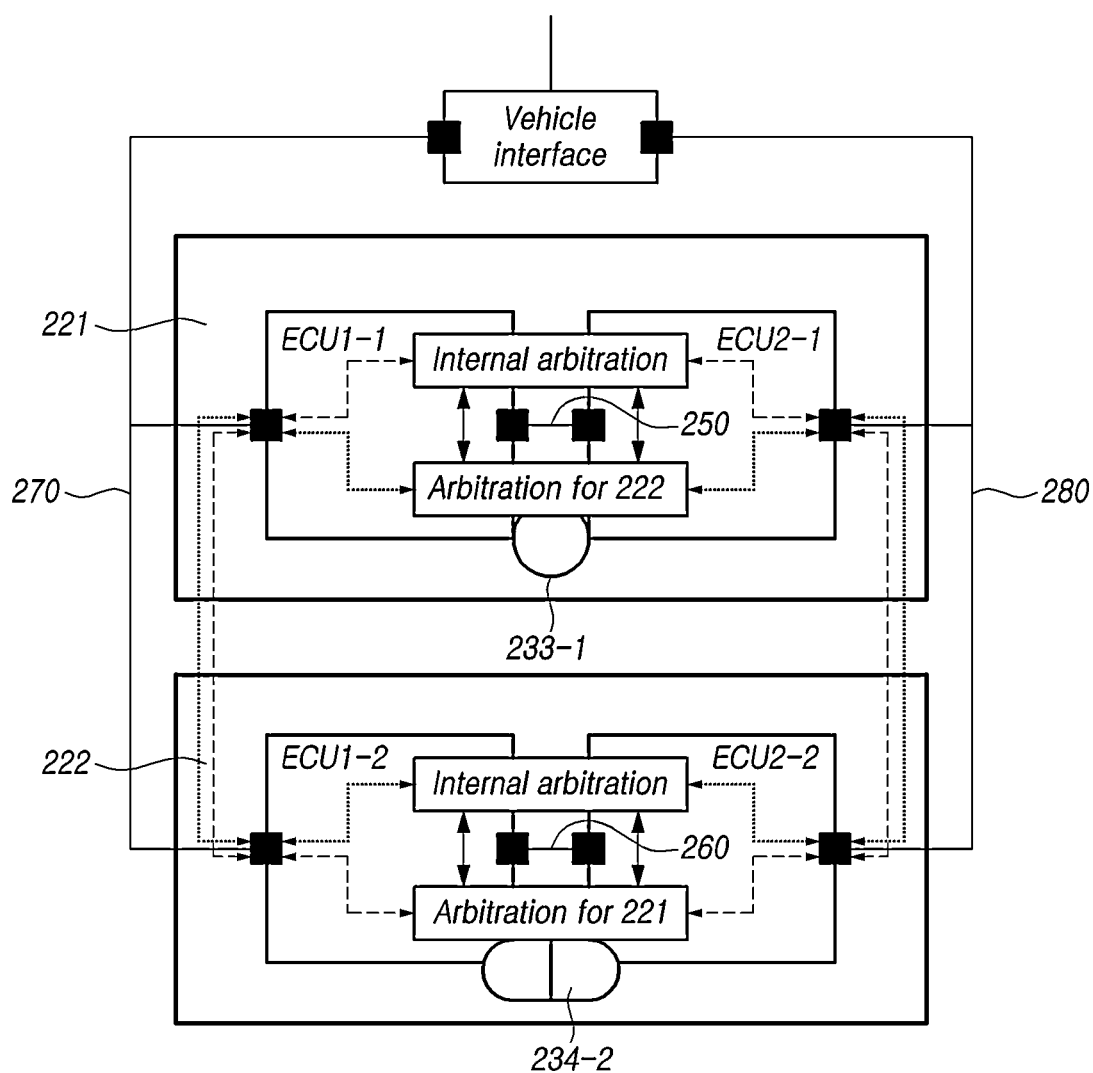

Referring to FIG. 9, in the steering assist device according to the present embodiments, the input-side steering motor may include a single winding-type input-side steering motor 233-1, and the output-side steering motor may include a dual winding-type output-side steering motor 234-2.

The first and second input-side steering control modules ECU1-1 and ECU2-1 may arbitrate input-side role assignment and determine that one is an input-side primary steering control module and the other is an input-side redundant steering control module according to the result of input-side role assignment arbitration. The input-side primary steering control module may control the single winding-type input-side steering motor 233-1 and, if the input-side primary steering control module switches to the abnormal state, the input-side redundant steering control module may control the single winding-type input-side steering motor 233-1 instead of the input-side primary steering control module.

The first and second output-side steering control modules ECU1-2 and ECU2-2 may arbitrate output-side role assignment and determine that one is an output-side primary steering control module and the other is an output-side redundant steering control module according to the result of output-side role assignment arbitration. The output-side primary steering control module and the output-side redundant steering control module may control the dual winding-type output-side steering motor 234-2 and, if the output-side primary steering control module switches to the abnormal state, the output-side redundant steering control module may control the dual winding-type output-side steering motor 234-2.

Figure 10:
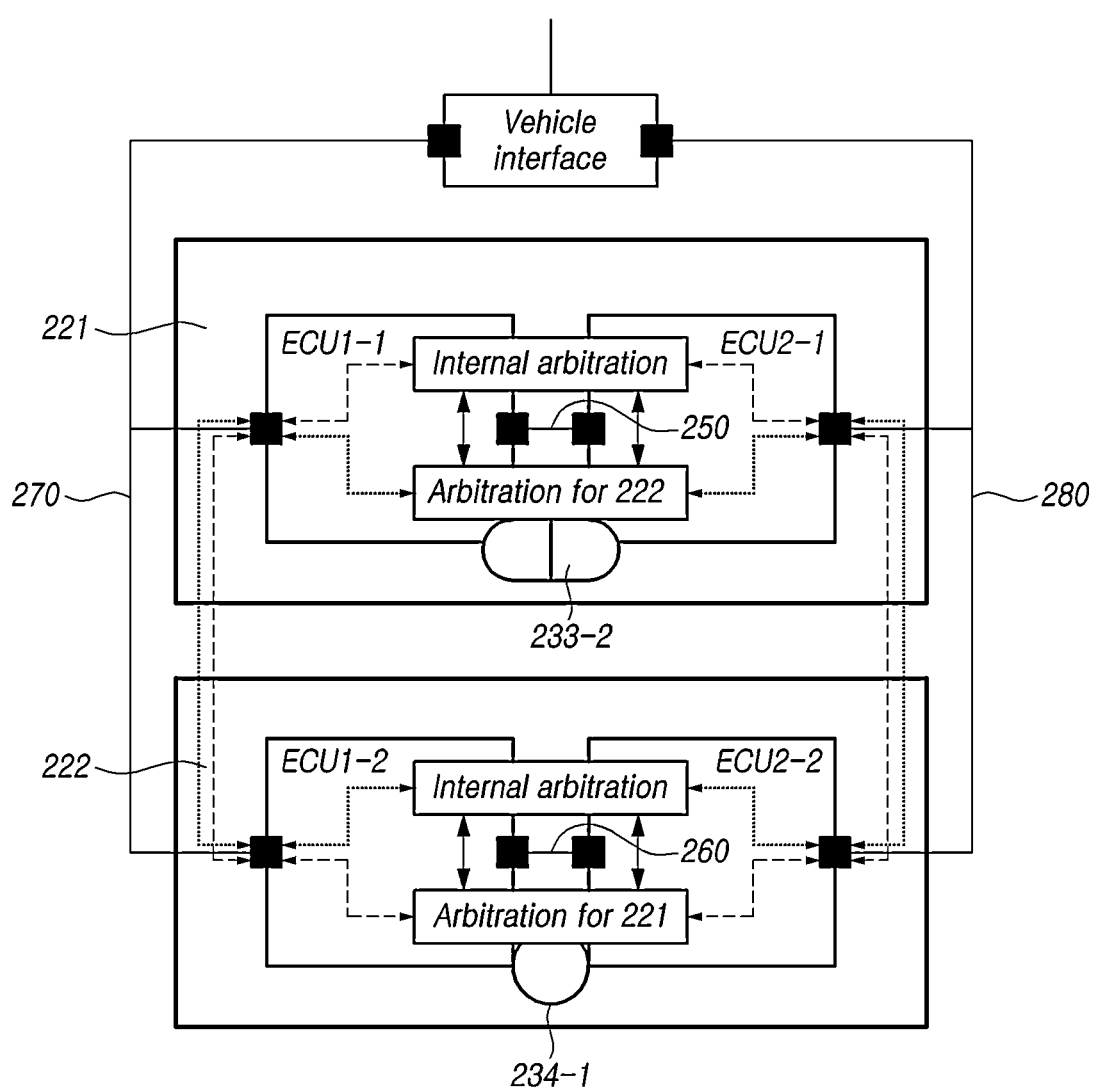

Referring to FIG. 10, in the steering assist device according to the present embodiments, the input-side steering motor may include a dual winding-type input-side steering motor 233-2, and the output-side steering motor may include a single winding-type output-side steering motor 234-1.

The first and second input-side steering control modules ECU1-1 and ECU2-1 may arbitrate input-side role assignment and determine that one is an input-side primary steering control module and the other is an input-side redundant steering control module according to the result of input-side role assignment arbitration. The input-side primary steering control module and the input-side redundant steering control module may control the dual winding-type input-side steering motor 233-2 and, if the input-side primary steering control module switches to the abnormal state, the input-side redundant steering control module may control the dual winding-type input-side steering motor 233-2.

The first and second output-side steering control modules ECU1-2 and ECU2-2 may arbitrate output-side role assignment and determine that one is an output-side primary steering control module and the other is an output-side redundant steering control module according to the result of output-side role assignment arbitration. The output-side primary steering control module may control the single winding-type output-side steering motor 234-1 and, if the output-side primary steering control module switches to the abnormal state, the output-side redundant steering control module may control the single winding-type output-side steering motor 234-1 instead of the output-side primary steering control module.

Figure 11:
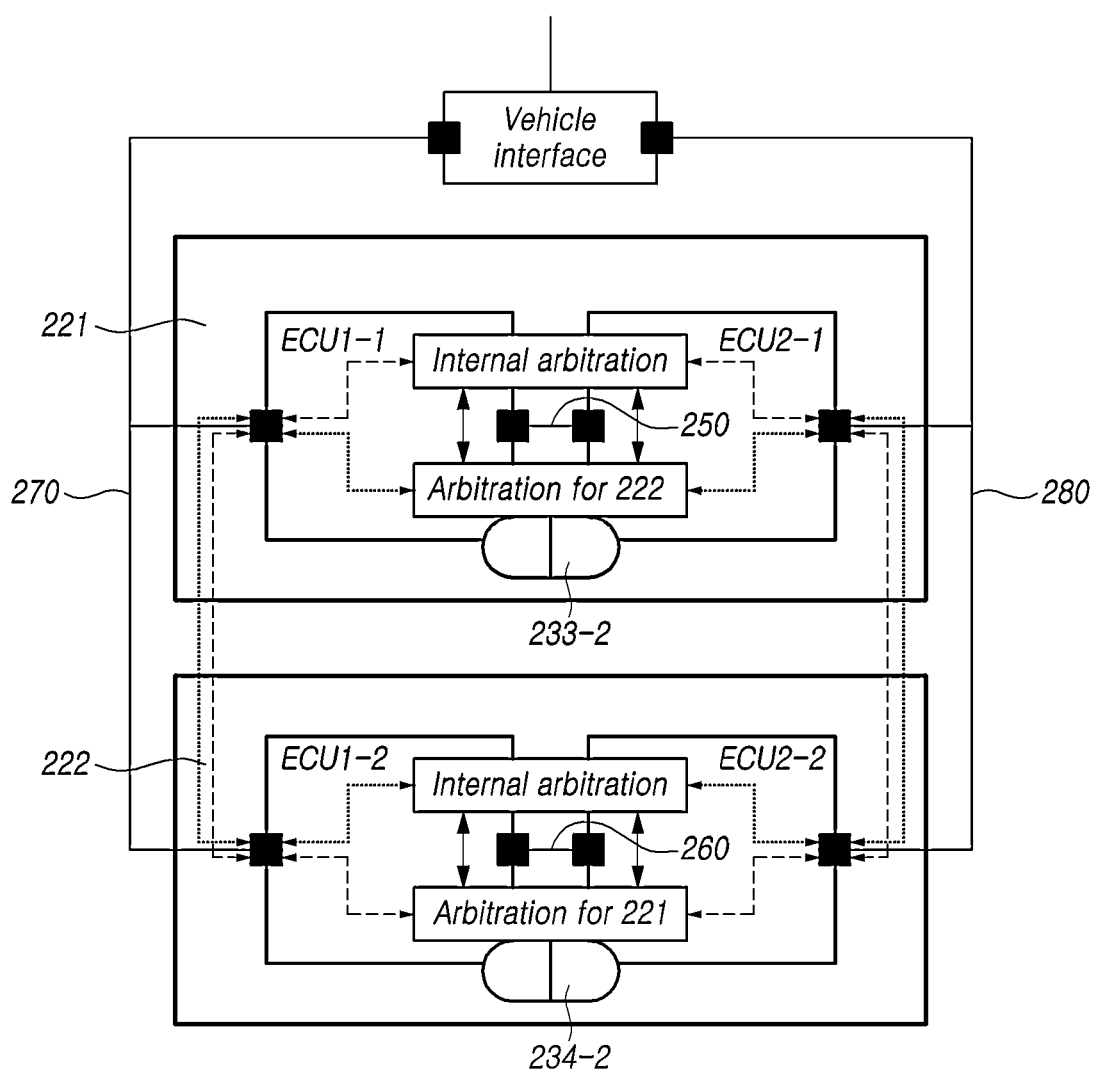

Referring to FIG. 11, in the steering assist device according to the present embodiments, the input-side steering motor may include a dual winding-type input-side steering motor 233-2, and the output-side steering motor may include the dual winding-type output-side steering motor 243-2.

The first and second input-side steering control modules ECU1-1 and ECU2-1 may arbitrate input-side role assignment and determine that one is an input-side primary steering control module and the other is an input-side redundant steering control module according to the result of input-side role assignment arbitration. The input-side primary steering control module and the input-side redundant steering control module may control the dual winding-type input-side steering motor 233-2 and, if the input-side primary steering control module switches to the abnormal state, the input-side redundant steering control module may control the dual winding-type input-side steering motor 233-2.

The first and second output-side steering control modules ECU1-2 and ECU2-2 may arbitrate output-side role assignment and determine that one is an output-side primary steering control module and the other is an output-side redundant steering control module according to the result of output-side role assignment arbitration. The output-side primary steering control module and the output-side redundant steering control module may control the dual winding-type output-side steering motor 234-2 and, if the output-side primary steering control module switches to the abnormal state, the output-side redundant steering control module may control the dual winding-type output-side steering motor 234-2.

Meanwhile, the communication here may include the CAN communication but, without limitations thereto, include any communication that may connect the first and second input-side steering control modules, the first and second output-side steering control modules, and the vehicle.

A steering assist method according to the present embodiments is described below with reference to the accompanying drawings. What overlaps the steering system and steering assist device described above in connection with FIGS. 1 to 11 according to the present embodiments is omitted from further description for brevity of description.

Figure 12:
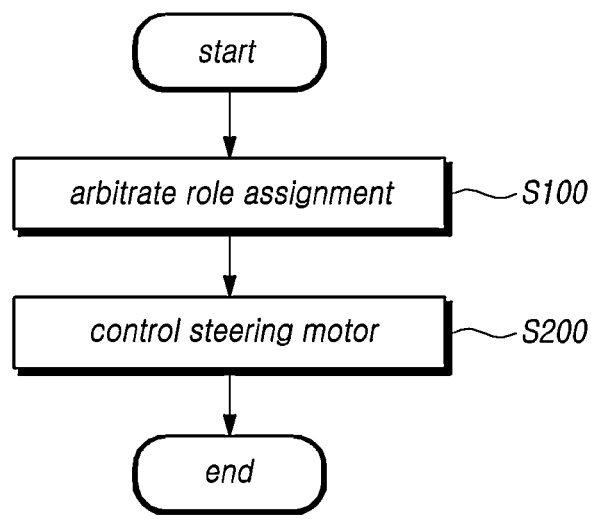
FIG. 12 is a flowchart illustrating a steering assist method according to the present embodiments.

FIG. 12 is a flowchart illustrating a steering assist method according to the present embodiments.

Referring to FIG. 12, a steering assist method according to the present embodiments may include at least one of the step S100 of arbitrating role assignment and the step S200 of controlling the steering motor.

The steering assist method according to the present embodiments may be a steering assist method that assists the input-side mechanism connected with the steering wheel and the output-side mechanism connected with the wheel, through the first and second input-side steering control modules controlling the input-side steering motor connected with the input-side mechanism and the first and second output-side steering control modules controlling the output-side steering motor connected with the output-side mechanism.

First, role assignment may be arbitrated through the first and second input-side steering control modules and the first and second output-side steering control modules (S100).

For example, in step S100, input-side role assignment may be arbitrated through the first and second input-side steering control modules.

Further, in step S100, output-side role assignment may be arbitrated through the first and second output-side steering control modules.

Here, step S100 may arbitrate role assignment, upon initial operation of the steering assist device, through the first and second input-side steering control modules and the first and second output-side steering control modules.

Thereafter, a corresponding steering motor of the input-side steering motor and the output-side steering motor may be controlled according to the result of role assignment arbitration, through the first and second input-side steering control modules and the first and second output-side steering control modules 9S200).

For example, in step S200, if the input-side role assignment arbitration succeeds in step S100, the input-side steering motor may be controlled according to the result of input-side role assignment arbitration and, if the input-side role assignment arbitration fails in step S100, the input-side steering motor may be controlled according to the result of input-side role assignment arbitration through the first and second output-side steering control modules.

Further, in step S200, if the output-side role assignment arbitration succeeds in step S100, the output-side steering motor may be controlled according to the result of output-side role assignment arbitration and, if the output-side role assignment arbitration fails in step S100, the output-side steering motor may be controlled according to the result of output-side role assignment arbitration through the first and second input-side steering control modules.

Meanwhile, the steering assist method according to the present embodiments may further include a first internal communication channel connecting the first input-side steering control module and the second input-side steering control module; a second internal communication channel connecting the first output-side steering control module and the second output-side steering control module; a first external communication channel connecting the first input-side steering control module and the first output-side steering control module and connected with the vehicle; and a second external communication channel connecting the second input-side steering control module and the second output-side steering control module and connected with the vehicle and may thereby assist the input-side mechanism connected with the steering wheel and the output-side mechanism connected with the wheel.

For example, in step S100, their mutual states may be monitored based on the first internal communication channel through the first and second input-side steering control modules, so that the input-side role assignment may be arbitrated.

Thereafter, in step S200, if the input-side role assignment arbitration succeeds in step S100, the input-side steering motor may be controlled according to the result of input-side role assignment arbitration and, if the input-side role assignment arbitration fails in step S100, the input-side steering motor may be controlled according to the result of input-side role assignment arbitration by the first and second output-side steering control modules, received through the first and second external communication channels.

Specifically, when the first internal communication channel is in the normal state so that their mutual states are identified, and the identified mutual states are in the normal state through step S100, step S200 may determine that one is an input-side primary steering control module, and the other is an input-side redundant steering control module and control the input-side steering motor and, when the first internal communication channel is in the abnormal state so that their mutual states are not identified, but each state is in the normal state, determine that one is an input-side primary steering control module and the other is an input-side redundant steering control module according to the result of input-side role assignment arbitration by the first and second output-side steering control modules, received through the first and second external communication channels and control the input-side steering motor.

Further, in step S100, their mutual states may be monitored based on the second internal communication channel through the first and second output-side steering control modules, so that the output-side role assignment may be arbitrated.

Thereafter, in step S200, if the output-side role assignment arbitration succeeds in step S100, the output-side steering motor may be controlled according to the result of output-side role assignment arbitration and, if the output-side role assignment arbitration fails in step S100, the output-side steering motor may be controlled according to the result of output-side role assignment arbitration by the first and second input-side steering control modules, received through the first and second external communication channels.

Specifically, when the second internal communication channel is in the normal state so that their mutual states are identified, and the identified mutual states are in the normal state through step S100, step S200 may determine that one is an output-side primary steering control module, and the other is an output-side redundant steering control module and control the output-side steering motor and, when the second internal communication channel is in the abnormal state so that their mutual states are not identified, but each state is in the normal state, determine that one is an output-side primary steering control module and the other is an output-side redundant steering control module according to the result of output-side role assignment arbitration by the first and second input-side steering control modules, received through the first and second external communication channels and control the output-side steering motor.

Meanwhile, the steering assist method according to the present embodiments may further include an input-side steering motor including a single winding-type input-side steering motor or a dual winding-type input-side steering motor; and an output-side steering motor including a single winding-type output-side steering motor or a dual winding-type output-side steering motor and may thereby assist the input-side mechanism connected with the steering wheel and the output-side mechanism connected with the wheel.

For example, in the steering assist method according to the present embodiments, the input-side steering motor may include a single winding-type input-side steering motor, and the output-side steering motor may include a single winding-type output-side steering motor, and the input-side mechanism connected with the steering wheel and the output-side mechanism connected with the wheel may be assisted therethrough.

In step S100, input-side role assignment may be arbitrated through the first and second input-side steering control modules.

Step S200 may determine that one is an input-side primary steering control module and the other is an input-side redundant steering control module according to the result of input-side role assignment arbitration in step S100, through the first and second input-side steering control modules, control the single winding-type input-side steering motor through the input-side primary steering control module and, if the input-side primary steering control module switches to the abnormal state, control the single winding-type input-side steering motor, instead of the input-side primary steering control module, through the input-side redundant steering control module.

Further, in step S100, output-side role assignment may be arbitrated through the first and second output-side steering control modules.

Step S200 may determine that one is an output-side primary steering control module and the other is an output-side redundant steering control module according to the result of output-side role assignment arbitration in step S100, through the first and second output-side steering control modules, control the single winding-type output-side steering motor through the output-side primary steering control module and, if the output-side primary steering control module switches to the abnormal state, control the single winding-type output-side steering motor, instead of the output-side primary steering control module, through the output-side redundant steering control module.

For example, in the steering assist method according to the present embodiments, the input-side steering motor may include a single winding-type input-side steering motor, and the output-side steering motor may include a dual winding-type output-side steering motor, and the input-side mechanism connected with the steering wheel and the output-side mechanism connected with the wheel may be assisted therethrough.

In step S100, input-side role assignment may be arbitrated through the first and second input-side steering control modules.

Step S200 may determine that one is an input-side primary steering control module and the other is an input-side redundant steering control module according to the result of input-side role assignment arbitration in step S100, through the first and second input-side steering control modules, control the single winding-type input-side steering motor through the input-side primary steering control module and, if the input-side primary steering control module switches to the abnormal state, control the single winding-type input-side steering motor, instead of the input-side primary steering control module, through the input-side redundant steering control module.

Further, in step S100, output-side role assignment may be arbitrated through the first and second output-side steering control modules.

Step S200 may determine that one is an output-side primary steering control module and the other is an output-side redundant steering control module according to the result of output-side role assignment arbitration in step S100, through the first and second output-side steering control modules, control the dual winding-type output-side steering motor through the output-side primary steering control module and the output-side redundant steering control module and, if the output-side primary steering control module switches to the abnormal state, control the dual winding-type output-side steering motor through the output-side redundant steering control module.

For example, in the steering assist method according to the present embodiments, the input-side steering motor may include a dual winding-type input-side steering motor, and the output-side steering motor may include a single winding-type output-side steering motor, and the input-side mechanism connected with the steering wheel and the output-side mechanism connected with the wheel may be assisted therethrough.

In step S100, input-side role assignment may be arbitrated through the first and second input-side steering control modules.

Step S200 may determine that one is an input-side primary steering control module and the other is an input-side redundant steering control module according to the result of input-side role assignment arbitration in step S100, through the first and second input-side steering control modules, control the dual winding-type input-side steering motor through the input-side primary steering control module and the input-side redundant steering control module and, if the input-side primary steering control module switches to the abnormal state, control the dual winding-type input-side steering motor through the input-side redundant steering control module.

Further, in step S100, output-side role assignment may be arbitrated through the first and second output-side steering control modules.

Step S200 may determine that one is an output-side primary steering control module and the other is an output-side redundant steering control module according to the result of output-side role assignment arbitration in step S100, through the first and second output-side steering control modules, control the single winding-type output-side steering motor through the output-side primary steering control module and, if the output-side primary steering control module switches to the abnormal state, control the single winding-type output-side steering motor, instead of the output-side primary steering control module, through the output-side redundant steering control module.

For example, in the steering assist method according to the present embodiments, the input-side steering motor may include a dual winding-type input-side steering motor, and the output-side steering motor may include a dual winding-type output-side steering motor, and the input-side mechanism connected with the steering wheel and the output-side mechanism connected with the wheel may be assisted therethrough.

In step S100, input-side role assignment may be arbitrated through the first and second input-side steering control modules.

Step S200 may determine that one is an input-side primary steering control module and the other is an input-side redundant steering control module according to the result of input-side role assignment arbitration in step S100, through the first and second input-side steering control modules, control the dual winding-type input-side steering motor through the input-side primary steering control module and the input-side redundant steering control module and, if the input-side primary steering control module switches to the abnormal state, control the dual winding-type input-side steering motor through the input-side redundant steering control module.

Further, in step S100, output-side role assignment may be arbitrated through the first and second output-side steering control modules.

Step S200 may determine that one is an output-side primary steering control module and the other is an output-side redundant steering control module according to the result of output-side role assignment arbitration in step S100, through the first and second output-side steering control modules, control the dual winding-type output-side steering motor through the output-side primary steering control module and the output-side redundant steering control module and, if the output-side primary steering control module switches to the abnormal state, control the dual winding-type output-side steering motor through the output-side redundant steering control module.

The steering assist method according to the present embodiments is an arbitration control method for implementing high availability of a steering system (e.g., an SbW system) and may compensate for weaknesses of distributed arbitration performed by the unit system in an environment of multiple devices and increase the system availability for an arbitration error by implementing an arbitration control logic of an external device to thereby secure safety.

Figure 13:
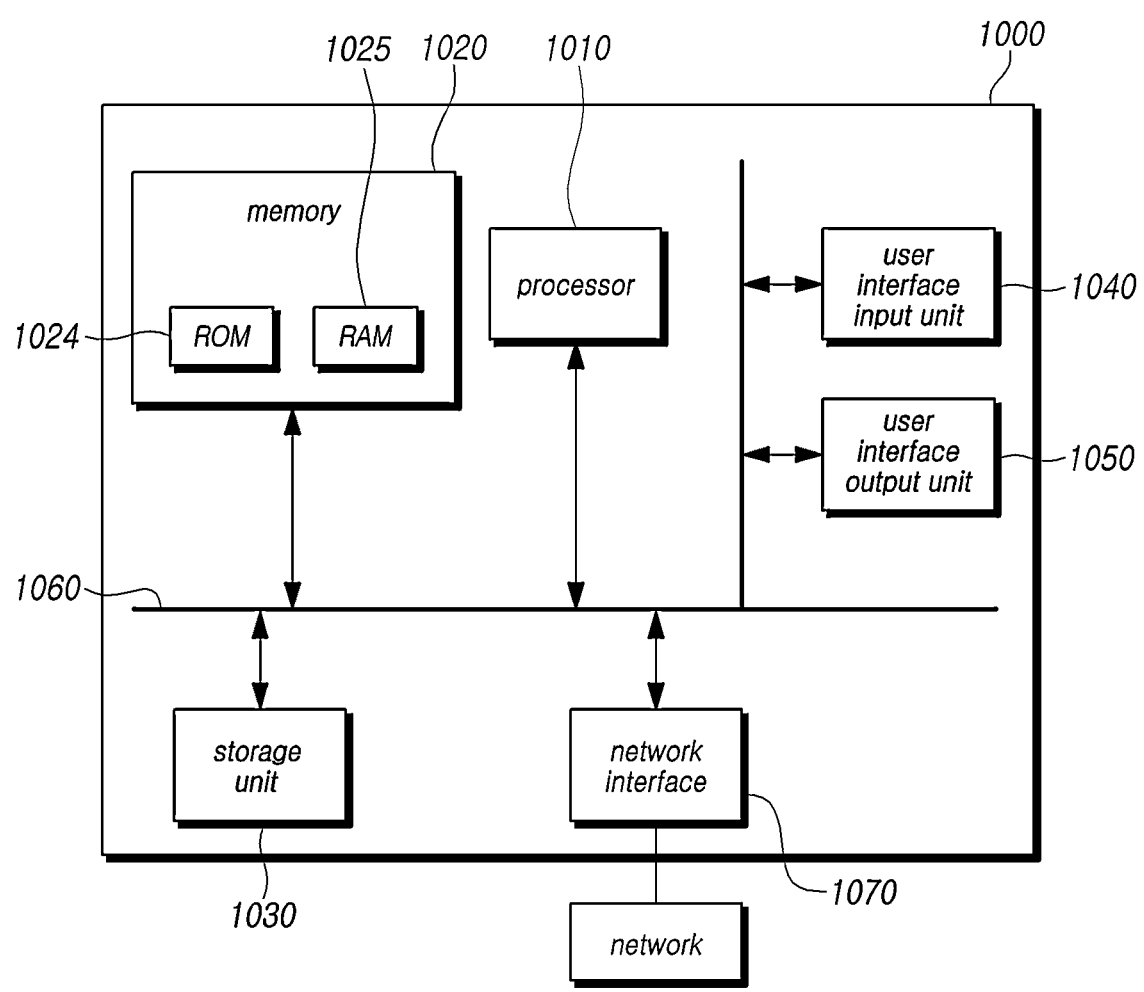
FIG. 13 is a block diagram illustrating a configuration of a computer system for a steering assist device and a steering system according to the present embodiments.

FIG. 13 is a block diagram illustrating a configuration of a computer system for a steering assist device and a steering system according to the present embodiments.

Referring to FIG. 13, the above-described embodiments may be implemented as, e.g., a computer-readable recording medium, in a computer system. As illustrated in the drawings, the computer system 1000 of the steering assist device and steering system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to the present embodiments of the disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application is the U.S. National Stage of International Patent Application No. PCT/KR2021/001498 filed on Feb. 4, 2021, which claims priority to Korean Patent Application No. 10-2020-0016334 filed in the Korean Intellectual Property Office on Feb. 11, 2020, the disclosures of which are incorporated by reference herein in their entireties.

The invention claimed is:

1. A steering assist device, comprising:
first and second input-side steering control modules controlling an input-side steering motor to allow an input-side mechanism connected with a steering wheel to be assisted; and
first and second output-side steering control modules controlling an output-side steering motor to allow an output-side mechanism mechanically separated from the input-side mechanism and connected with a wheel to be assisted, wherein the first and second input-side steering control modules and the first and second output-side steering control modules arbitrate role assignment and control a corresponding steering motor of the input-side steering motor and the output-side steering motor according to a result of arbitrating the role assignment.

2. The steering assist device of claim 1, wherein the first and second input-side steering control modules arbitrate input-side role assignment, if the input-side role assignment succeeds, control the input-side steering motor according to a result of input-side role assignment arbitration and, if the input-side role assignment fails, control the input-side steering motor according to the result of input-side role assignment arbitration through the first and second output-side steering control modules.

3. The steering assist device of claim 2, wherein the first and second output-side steering control modules arbitrate output-side role assignment, if the output-side role assignment succeeds, control the output-side steering motor according to a result of output-side role assignment arbitration and, if the output-side role assignment fails, control the output-side steering motor according to the result of output-side role assignment arbitration through the first and second input-side steering control modules.

4. The steering assist device of claim 1, further comprising:
   a first internal communication channel connecting the first input-side steering control module and the second input-side steering control module;
   a second internal communication channel connecting the first output-side steering control module and the second output-side steering control module;
   a first external communication channel connecting the first input-side steering control module and the first output-side steering control module and connected with a vehicle; and
   a second external communication channel connecting the second input-side steering control module and the second output-side steering control module and connected with the vehicle.

5. The steering assist device of claim 4, wherein the first and second input-side steering control modules monitor their mutual states through the first internal communication channel to arbitrate the input-side role assignment, if the input-side role assignment succeeds, control the input-side steering motor according to a result of input-side role assignment arbitration and, if the input-side role assignment fails, control the input-side steering motor according to the result of input-side role assignment arbitration by the first and second output-side steering control modules, received through the first and second external communication channels.

6. The steering assist device of claim 5, wherein the first and second input-side steering control modules, if the first internal communication channel is in a normal state so that their mutual states are identified, and the identified mutual states are in a normal state, determine that one is an input-side primary steering control module and the other is an input-side redundant steering control module and control the input-side steering motor, and if the first internal communication channel is in an abnormal state so that their mutual states are not identified, but each state is in a normal state, determine that one is the input-side primary steering control module and the other is the input-side redundant steering control module according to the result of input-side role assignment arbitration by the first and second output-side steering control modules, received through the first and second external communication channels and control the input-side steering motor.

7. The steering assist device of claim 4, wherein the first and second output-side steering control modules monitor their mutual states through the second internal communication channel to arbitrate the output-side role assignment, if the output-side role assignment succeeds, control the output-side steering motor according to a result of output-side role assignment arbitration and, if the output-side role assignment fails, control the output-side steering motor according to the result of output-side role assignment arbitration by the first and second input-side steering control modules, received through the first and second external communication channels.

8. The steering assist device of claim 7, wherein the first and second output-side steering control modules, if the second internal communication channel is in a normal state so that their mutual states are identified, and the identified mutual states are in a normal state, determine that one is an output-side primary steering control module and the other is an output-side redundant steering control module and control the output-side steering motor, and if the second internal communication channel is in an abnormal state so that their mutual states are not identified, but each state is in a normal state, determine that one is the output-side primary steering control module and the other is the output-side redundant steering control module according to the result of output-side role assignment arbitration by the first and second input-side steering control modules, received through the first and second external communication channels and control the output-side steering motor.

9. The steering assist device of claim 1, further comprising:
   an input-side steering motor including a single winding-type input-side steering motor or a dual-winding-type input-side steering motor; and
   an output-side steering motor including a single winding-type output-side steering motor or a dual-winding-type output-side steering motor.

10. The steering assist device of claim 9, wherein if the input-side steering motor includes the single winding-type input-side steering motor, and the output-side steering motor includes the single winding-type output-side steering motor, the first and second input-side steering control modules arbitrate input-side role assignment and determine that one is an input-side primary steering control module and the other is an input-side redundant steering control module according to a result of input-side role assignment arbitration, wherein the input-side primary steering control module controls the single winding-type input-side steering motor and, if the input-side primary steering control module switches to an abnormal state, the input-side redundant steering control module controls the single winding-type input-side steering motor instead of the input-side primary steering control module, and the first and second output-side steering control modules arbitrate output-side role assignment and determine that one is an output-side primary steering control module and the other is an output-side redundant steering control module according to a result of output-side role assignment arbitration, wherein the output-side primary steering control module controls the single winding-type output-side steering motor and, if the output-side primary steering control module switches to an abnormal state, the output-side redundant steering control module controls the single winding-type output-side steering motor instead of the output-side primary steering control module.

11. The steering assist device of claim 9, wherein if the input-side steering motor includes the single winding-type input-side steering motor, and the output-side steering motor includes the dual winding-type output-side steering motor, the first and second input-side steering control modules arbitrate input-side role assignment and determine that one is an input-side primary steering control module and the other is an input-side redundant steering control module according to a result of input-side role assignment arbitration, wherein the input-side primary steering control module controls the single winding-type input-side steering motor and, if the input-side primary steering control module switches to an abnormal state, the input-side redundant steering control module controls the single winding-type input-side steering motor instead of the input-side primary steering control module, and the first and second output-side steering control modules arbitrate output-side role assignment and determine that one is an output-side primary steering control module and the other is an output-side redundant steering control module according to a result of output-side role assignment arbitration, wherein the output-side primary steering control module and the output-side redundant steering control module control the dual winding-type output-side steering motor and, if the output-side primary steering control module switches to an abnormal state, the output-side redundant steering control module controls the dual winding-type output-side steering motor.

12. The steering assist device of claim 9, wherein if the input-side steering motor includes the dual winding-type input-side steering motor, and the output-side steering motor includes the single winding-type output-side steering motor, the first and second input-side steering control modules arbitrate input-side role assignment and determine that one is an input-side primary steering control module and the other is an input-side redundant steering control module according to a result of input-side role assignment arbitration, wherein the input-side primary steering control module and the input-side redundant steering control module control the dual winding-type input-side steering motor and, if the input-side primary steering control module switches to an abnormal state, the input-side redundant steering control module controls the dual winding-type input-side steering motor, and the first and second output-side steering control modules arbitrate output-side role assignment and determine that one is an output-side primary steering control module and the other is an output-side redundant steering control module according to a result of output-side role assignment arbitration, wherein the output-side primary steering control module controls the single winding-type output-side steering motor and, if the output-side primary steering control module switches to an abnormal state, the output-side redundant steering control module controls the single winding-type output-side steering motor instead of the output-side primary steering control module.

13. The steering assist device of claim 9, wherein if the input-side steering motor includes the dual winding-type input-side steering motor, and the output-side steering motor includes the dual winding-type output-side steering motor, the first and second input-side steering control modules arbitrate input-side role assignment and determine that one is an input-side primary steering control module and the other is an input-side redundant steering control module according to a result of input-side role assignment arbitration, wherein the input-side primary steering control module and the input-side redundant steering control module control the dual winding-type input-side steering motor and, if the input-side primary steering control module switches to an abnormal state, the input-side redundant steering control module controls the dual winding-type input-side steering motor, and the first and second output-side steering control modules arbitrate output-side role assignment and determine that one is an output-side primary steering control module and the other is an output-side redundant steering control module according to a result of output-side role assignment arbitration, wherein the output-side primary steering control module and the output-side redundant steering control module control the dual winding-type output-side steering motor and, if the output-side primary steering control module switches to an abnormal state, the output-side redundant steering control module controls the dual winding-type output-side steering motor.

14. A steering assist method for assisting an input-side mechanism connected with a steering wheel and an output-side mechanism connected with a wheel, through first and second input-side steering control modules controlling an input-side steering motor connected with the input-side mechanism and first and second output-side steering control modules controlling an output-side steering motor connected with the output-side mechanism, the steering assist method comprising:
  arbitrating role assignment through the first and second input-side steering control modules and the first and second output-side steering control modules; and
  controlling a corresponding steering motor of the input-side steering motor and the output-side steering motor according to a result of role assignment arbitration through the first and second input-side steering control modules and the first and second output-side steering control modules.

15. A steering system, comprising:
  a steering device including an input-side mechanism connected with a steering wheel and an output-side mechanism mechanically separated from the input-side mechanism and connected with a wheel; and
  a steering assist device including first and second input-side steering control modules controlling an input-side steering motor to allow the input-side mechanism to be assisted; and first and second output-side steering control modules controlling an output-side steering motor to allow the output-side mechanism to be assisted, wherein the first and second input-side steering control modules and the first and second output-side steering control modules arbitrate role assignment and control a corresponding steering motor of the input-side steering motor and the output-side steering motor according to a result of arbitrating the role assignment.

* * * * *